(12) United States Patent
Niemoller et al.

(10) Patent No.: US 9,705,741 B2
(45) Date of Patent: *Jul. 11, 2017

(54) DYNAMICALLY ALLOCATING NETWORK ADDRESSES

(71) Applicant: Amazon Technologies, Inc., Seattle, WA (US)

(72) Inventors: Albert P. Niemoller, Seattle, WA (US); Andrew B. Dickinson, Seattle, WA (US); Bradley D. Roberts, Bellevue, WA (US); Eric P. Wei, Seattle, WA (US); Colin J. Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,999

(22) Filed: Jun. 5, 2015

(65) Prior Publication Data
US 2015/0271018 A1    Sep. 24, 2015

Related U.S. Application Data

(63) Continuation of application No. 13/621,891, filed on Sep. 18, 2012, now Pat. No. 9,055,112.

(51) Int. Cl.
*G06F 15/177* (2006.01)
*H04L 12/24* (2006.01)
(Continued)

(52) U.S. Cl.
CPC .......... *H04L 41/0813* (2013.01); *H04L 47/82* (2013.01); *H04L 61/2007* (2013.01);
(Continued)

(58) Field of Classification Search
CPC ............. H04L 41/0813; H04L 61/2015; H04L 61/02061
See application file for complete search history.

(56) References Cited

U.S. PATENT DOCUMENTS 5,835,723 A    11/1998  Andrews et al.
7,197,549 B1    3/2007  Hussein et al.
(Continued)

FOREIGN PATENT DOCUMENTS

CN    101409689 A    4/2009
CN    101448012 A    6/2009
(Continued)

OTHER PUBLICATIONS

Office Action from the Canadian Intellectual Property Office for CA 2,881,149 mailed Feb. 16, 2016.
(Continued)

*Primary Examiner* — Mohamed Wasel
(74) *Attorney, Agent, or Firm* — Thomas | Horstemeyer, LLP

(57) ABSTRACT

Network addresses are dynamically allocated to devices based on demand. It is determined that a quantity of virtualized machine instances executed on a plurality of computing devices has changed. An updated network address allocation is dynamically assigned to a subdivision of a network in response to the quantity of virtualized machine instances. The subdivision includes the plurality of computing devices. A router for the subdivision is reconfigured to implement the updated network address allocation.

20 Claims, 5 Drawing Sheets

(51) Int. Cl.
*H04L 29/12* (2006.01)
*H04L 12/911* (2013.01)

(52) U.S. Cl.
CPC ...... *H04L 61/2015* (2013.01); *H04L 61/2061* (2013.01); *H04L 61/2038* (2013.01)

(56) References Cited

U.S. PATENT DOCUMENTS

| | | | |
|---|---|---|---|
| 7,299,294 | B1 | 11/2007 | Bruck et al. |
| 7,788,345 | B1 | 8/2010 | Sukiman et al. |
| 8,631,100 | B2 | 1/2014 | Gandhewar et al. |
| 2002/0161874 | A1 | 10/2002 | McGuire |
| 2004/0267923 | A1 | 12/2004 | Rover et al. |
| 2005/0002778 | A1 | 1/2005 | Fried et al. |
| 2005/0027778 | A1 | 2/2005 | Dimitrelis et al. |
| 2005/0278784 | A1 | 12/2005 | Gupta et al. |
| 2008/0002723 | A1 | 1/2008 | Pusateri |
| 2008/0101353 | A1 | 5/2008 | Streijl et al. |
| 2009/0106404 | A1* | 4/2009 | Christenson ...... H04L 29/12952 709/222 |
| 2010/0125667 | A1 | 5/2010 | Soundararajan |
| 2010/0217655 | A1 | 8/2010 | Kuehnel et al. |
| 2011/0239291 | A1 | 9/2011 | Sotka |
| 2011/0292946 | A1 | 12/2011 | Flinta et al. |
| 2012/0297086 | A1 | 11/2012 | Gu et al. |
| 2013/0041987 | A1 | 2/2013 | Warno |
| 2013/0346618 | A1 | 12/2013 | Holkkola |
| 2014/0025770 | A1* | 1/2014 | Warfield ......... G06F 15/17331 709/213 |

FOREIGN PATENT DOCUMENTS

| | | |
|---|---|---|
| CN | 102395959 A | 3/2012 |
| RU | 2282950 C2 | 8/2006 |
| WO | 2011032746 A1 | 3/2011 |

OTHER PUBLICATIONS

English Translation of the Office Action from the Japanese Patent Office for JP 2015-527685 mailed Apr. 8, 2016.
Office Action from the Japanese Patent Office for JP 2015-527685 mailed Apr. 8, 2016.
Written Opinion for Singapore Patent Application No. 11201502056R mailed on Sep. 4, 2015.
International Searching Authority and Written Opinion mailed Apr. 8, 2014 for PCT/US2013/059631 filed Sep. 13, 2013.
Hu et al. "Automatically configuring the network layer of data centers for cloud computing" 1-15 [online]IBM J. Res. & Dev. vol. 55 No. 6 Paper Nov. 3/Dec. 2011. [retrieved Mar. 12, 2013] Retrieved from the Internet<URL: http://www.cse.ust.hk/-kaichen/papers/ibm11.pdf> p. 3:1 to p. 3:9.
CN Office Action for CN 201380048537.9 mailed Aug. 15, 2016.
Translation of CN Office Action for CN 201380048537.9 mailed Aug. 15, 2016.
Russian Federation Office Action for 2015114530 mailed Apr. 14, 2016.
English Translation for Russian Federation Office Action for 2015114530 mailed Apr. 14, 2016.
English Translation of the Abstract for RU 2282950 published Aug. 27, 2006.
European Patent Application EP13838493.8 filed on Sep. 13, 2013, Extended European Search Report mailed on Apr. 5, 2016.
Australian Patent Application AU2013318330 filed on Sep. 13, 2013, Examination Report mailed on Sep. 23, 2015.
Australian Patent Application AU2013318330 filed on Sep. 13, 2013, Response to Examination Report mailed on Feb. 16, 2016.
Australian Patent Application AU2013318330 filed on Sep. 13, 2013, Notice of Acceptance mailed on Mar. 29, 2016.
Australian Patent Application AU2013318330 filed on Sep. 13, 2013, Certificate of Grant mailed on Jul. 26, 2016.
Canadian Patent Application CA2,881,149 filed on Sep. 23, 2013, Response to Office Action mailed on Aug. 15, 2016.
Japanese Patent Application JA2015-527685 filed on Sep. 13, 2013, Notice of Allowance mailed on Jul. 12, 2016.
Japanese Patent Application JA2015-527685 filed on Sep. 13, 2013, Letters Patent mailed on Sep. 23, 2016.
Singapore Patent Application SG11201502056R filed on Sep. 13, 2013, Final Examination Report mailed on Apr. 19, 2016.
Singapore Patent Application SG11201502056R filed on Sep. 13, 2013, Certificate of Grant mailed on Jun. 21, 2016.
"DHCP Proxy Server Micro-block Allocation Scheme For IP Address Pool Management; draft-shen-dhc-block-alloc-03.txt", 5. JCT-VC Meeting; 96. MPEG Meeting; Mar. 3, 2011 to Mar. 23, 2011; Geneva; (Joint Collaborative Team on Video Coding of ISO/IEC JTC1/SC29/WG11 and ITU-T SG.16); Internet Engineering Task Force (IETF), Jan. 2007.

* cited by examiner

DYNAMICALLY ALLOCATING NETWORK ADDRESSES

CROSS-REFERENCE TO RELATED APPLICATIONS

This application is a continuation of, and claims priority to, co-pending U.S. Patent Application entitled "DYNAMICALLY ALLOCATING NETWORK ADDRESSES," filed on Sep. 18, 2012, and assigned application Ser. No. 13/621,891, which is incorporated herein by reference in its entirety.

BACKGROUND

Network devices may be associated with one or more network addresses per network interface. Network addresses facilitate routing of data to and from network devices. Internet protocol (IP) network addresses are associated with subnet masks, which indicate the portion of the network address that corresponds to a routing prefix and the portion of the network address that corresponds to a host identifier for a subnet. A subnet is a logically visible subdivision of an IP network. Subnets may be arranged logically in a hierarchical architecture, thereby partitioning network address space into a tree-like routing structure. Network address exhaustion is a potential problem for IP version 4, given that the network addresses are just 32 bits in length. IP version 6 uses 128-bit addresses and thus is not as easily susceptible to address exhaustion. Nonetheless, in spite of the address exhaustion issues, IP version 4 remains in common use.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
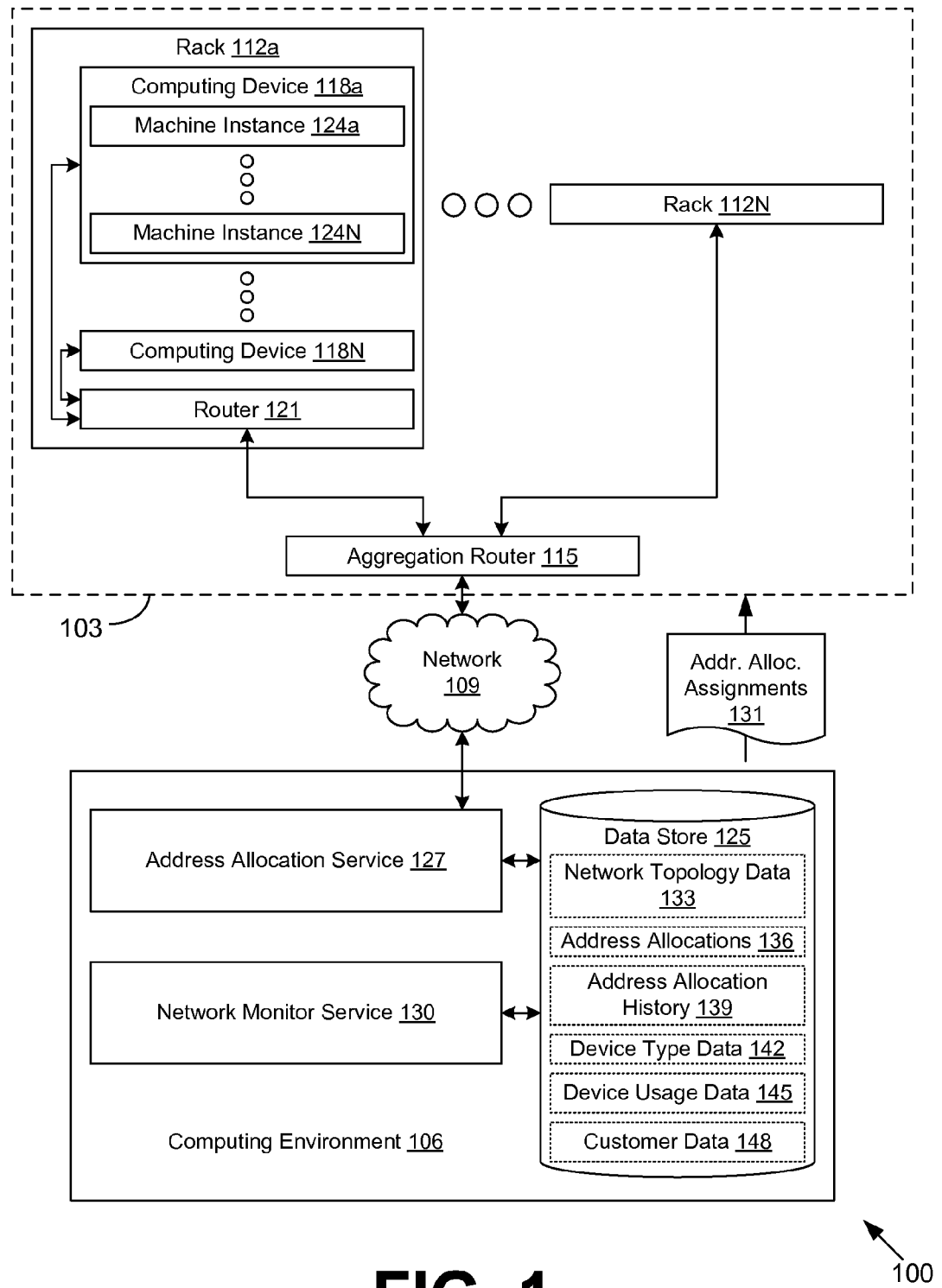
FIG. 1 is a drawing of a networked environment according to various embodiments of the present disclosure.

The present disclosure relates to dynamic assignment of network addresses to network devices based on demand. Network address exhaustion is a serious problem in internet protocol (IP) version 4 and potentially other communication protocols. Publicly accessible IP addresses are difficult to come by, and their allocation is carefully managed. Even private IP networks may face address exhaustion issues. Large private networks typically use, for example, the "10.0.0.0/8" address space (represented in classless inter-domain routing (CIDR) notation), which uses an eight-bit network prefix and a 24-bit host identifier and provides for nearly 17 million addresses (approximately $2^{24}$ addresses).

Such a substantial quantity may seem to be inexhaustible for an organization. However, if network address allocations are not managed well, address exhaustion issues may arise. For example, an organization may naively choose to allocate address space for a "/22" network for each rack in the data centers of the organization. A "/22" network provides for approximately 1024 (i.e., $2^{10}$) addresses. An organization using such an allocation scheme would be limited to 16,384 (or $2^{14}$) racks having "/22" allocations within the "10.0.0.0/8" address space. Such a limitation may present a real problem for large organizations.

The problem may be compounded if the network is further hierarchically structured. To illustrate, there may be some number of aggregation routers in the network, with some quantity of racks behind each of the aggregation routers. Suppose a "/15" network were allocated to each aggregation router. This provides for an allocation of approximately 131,072 (or $2^{17}$) addresses to each router, which could be further divided into 128 (or $2^7$) rack allocations of 1024 addresses each. Also, within the "10.0.0.0/8" address space, there could be 128 (or $2^7$) such aggregation routers. Scalability problems may arise with the total number of aggregation routers and/or the number of racks per aggregation router.

Such a rigid network address allocation scheme as discussed in the example above may not make sense if some racks use fewer than 1024 addresses. If a particular rack uses only 256 addresses, it would be wasteful to allocate 1024 address to the particular rack. However, when a rack is initially configured, it may not be known how many addresses will ultimately be used, especially when a variable number of machine instances may be employed in the rack. A large quantity such as 1024 may be selected as an upper bound, thereby leading to inefficiencies in allocation. Further, in some cases, the upper bound may be too low for racks that are densely configured.

Various embodiments of the present disclosure provide for dynamic allocation of network addresses based on demand to overcome these inefficiencies and scalability challenges. Manual, fixed configuration of network addresses may be replaced with automatic, dynamic configuration, which recognizes the dynamic nature of address use within network subdivisions having a variable number of machine instances. An initial number of network addresses may be allocated according to an initial physical configuration of a rack or other network subdivision. Additional network address allocations may be made to the network subdivision as necessary to meet demand. In the following discussion, a general description of the system and its components is provided, followed by a discussion of the operation of the same.

With reference to FIG. 1, shown is a networked environment 100 according to various embodiments. The networked environment 100 includes a hosted computing environment 103 and a computing environment 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

The hosted computing environment 103 may comprise a plurality of racks 112a . . . 112N, which may be provided connectivity to the network 109 by way of one or more aggregation routers 115. Although described as "racks," the racks 112 may correspond to other subdivisions of a hosted computing environment 103, e.g., data centers, rooms within data centers, groupings of racks, groupings of computing equipment, and so on. Each of the racks 112 may include a plurality of computing devices 118a . . . 118N and a router 121. The router 121 may correspond to a top-of-rack (TOR) router or other device that provides connectivity to the network 109 for the respective rack 112. The routers 121 may employ a routing protocol such as routing information protocol (RIP), open shortest path first (OSPF) or other routing protocols. Routers 121 may in some cases be constrained by the number of separate network address allocations that can be advertised.

The computing devices 118a may correspond to computing devices having a processor and memory circuit which are used to provide computing services to customers according to a utility computing model. To this end, a particular computing device 118a may include, for example, a plurality of machine instances 124a . . . 124N. The machine instances 124 within a computing device 118 may be hosted for one customer or multiple customers. As will be described, different machine instances 124 may have different characteristics. A given computing device 118 may be reconfigured dynamically to have any number of the machine instances 124.

It is noted that different racks 112 may have different types and quantities of computing devices 118. Some computing devices 118 may have relatively more computing resources, e.g., more memory, more powerful processor(s), faster data storage, etc. or different combinations of computing resources. Further, computing devices 118 may have different types and quantities of machine instances 124.

Each of the racks 112 may be assigned one or more network address allocations for connectivity to the network 109. In some cases, such network address allocations may be aggregated into an allocation given to the respective aggregation router 115, thereby providing a hierarchical structure to the portion of the network 109 in the hosted computing environment 103. The hosted computing environment 103 may have multiple aggregation routers 115 servicing different racks 112 or subdivisions of the network 109. The aggregation routers 115 may employ a routing protocol such as OSPF or other routing protocols. Aggregation routers 115 may in some cases be constrained by the number of separate network address allocations that can be advertised.

The computing environment 106 may comprise, for example, a server computer or any other system providing computing capability. Alternatively, the computing environment 106 may employ a plurality of computing devices that may be employed that are arranged, for example, in one or more server banks or computer banks or other arrangements. Such computing devices may be located in a single installation or may be distributed among many different geographical locations. For example, the computing environment 106 may include a plurality of computing devices that together may comprise a cloud computing resource, a grid computing resource, and/or any other distributed computing arrangement. In some cases, the computing environment 106 may correspond to an elastic computing resource where the allotted capacity of processing, network, storage, or other computing-related resources may vary over time.

Various applications and/or other functionality may be executed in the computing environment 106 according to various embodiments. Also, various data is stored in a data store 125 that is accessible to the computing environment 106. The data store 125 may be representative of a plurality of data stores 125 as can be appreciated. The data stored in the data store 125, for example, is associated with the operation of the various applications and/or functional entities described below.

The components executed on the computing environment 106, for example, include an address allocation service 127, a network monitor service 130, and other applications, services, processes, systems, engines, or functionality not discussed in detail herein. The address allocation service 127 is executed to generate address allocation assignments 131 of addresses on the network 109 for the hosted computing environment 103. The address allocation assignments 131 may correspond to initial assignments (e.g., when a rack 112 is initially configured) or subsequent assignments based on demand (e.g., demand created by reconfiguration of the computing devices 118 in the rack 112). The address allocation service 127 may manage releases of address allocations that are underutilized or are predicted to be underutilized. Further, the address allocation service 127 may be configured to consolidate address allocations to release address allocation space or to facilitate aggregation of allocations. In various embodiments, the address allocation service 127 may be split into two or more services, e.g., where one service includes the business logic to determine whether to assign or release allocations, and another service performs the implementation in the hosted computing environment 103.

The network monitor service 130 may be executed to monitor various aspects of the hosted computing environment 103. Such aspects may relate to resource consumption, network address utilization, resource consumption history, network address utilization history, velocities of increases or decreases in resource consumption or address utilization, and so on. The data generated by the network monitoring service 130 as a result of such monitoring may correspond to inputs to the address allocation service 127. Such inputs may allow the address allocation service 127 to make a decision as to whether to assign further network address allocations, release existing network address allocations, consolidate or aggregate network address allocations, and so on.

The data stored in the data store 125 includes, for example, network topology data 133, address allocations 136, address allocation history 139, device type data 142, device usage data 145, customer data 148, and potentially other data. The network topology data 133 may include information regarding the physical and logical network topology of the hosted computing environment 103. Such information may include data regarding racks 112 or other network subdivisions, computing devices 118 in the racks 112, routers 121, aggregation routers 115, and so on. The address allocations 136 describe the blocks of network addresses which have been assigned to aggregation routers 115, routers 121, computing devices 118, machine instances 124, and/or other components of the hosted computing environment 103. As a non-limiting example, an address allocation 136 may indicate that the addresses in the block "10.1.2.0/27" have been assigned to a particular router 121 associated with a rack 112.

The address allocation history 139 may indicate a history of address allocations 136 that have been made to particular components in the hosted computing environment 103. As a non-limiting example, the address allocation history 139 may indicate that a router 121 for a particular rack 112 had been assigned five "/27" address blocks, with one block being assigned every week. Thus, from the address allocation history 139, historical demand and velocity for address allocations may be determined.

The device type data 142 indicates characteristics of various computing devices 118 and machine instances 124. For example, a computing device 118 of a particular device type may be capable of accommodating five large-type machine instances 124, ten medium-type machine instances 124, or twenty small-type machine instances 124. The device usage data 145 may indicate current configurations and network address utilization for the various computing devices 118.

For example, the device usage data 145 may indicate that a current computing device 118 is partitioned into three large-type machine instances 124, where two of the machine instances 124 are using two network addresses and one of the machine instances 124 is using five network addresses. The device usage data 145 may also include network address usage history and velocity for previous and existing machine instances 124. Such data may be correlated with customer data 148 to determine network address and instance utilization for particular customers in the hosted computing environment 103.

Figure 2:
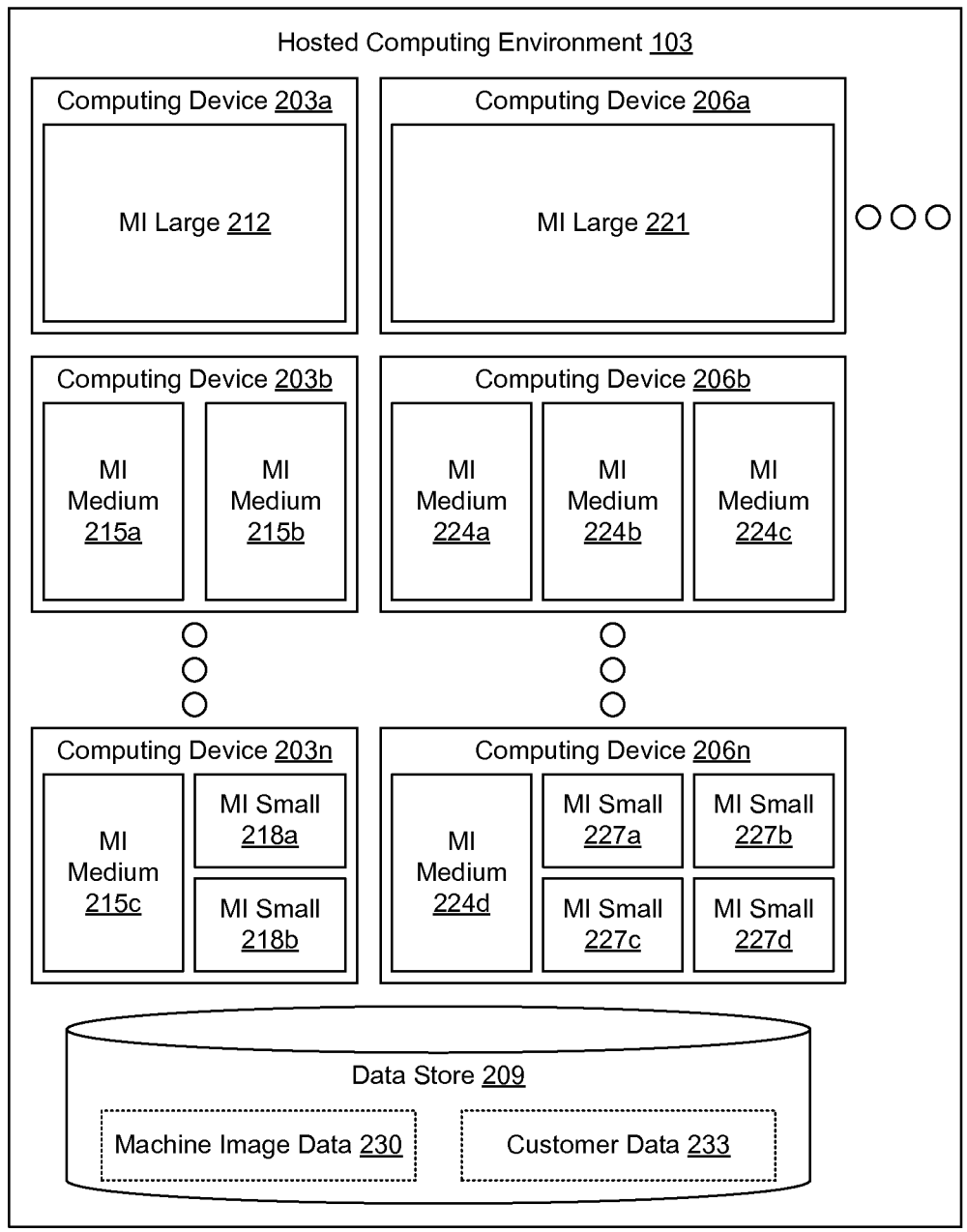
FIG. 2 is a drawing of one example of a hosted computing environment employed in the networked environment of FIG. 1 according to various embodiments of the present disclosure.

Referring next to FIG. 2, shown is one example of a hosted computing environment 103 according to various embodiments. The hosted computing environment 103 includes a plurality of computing devices 203a, 203b ... 203n, a plurality of computing devices 206a, 206b ... 206n, and a data store 209. Such components of the hosted computing environment 103 may be in data communication with each other and/or external computing devices by way of a network 109 (FIG. 1). Such computing devices 203 and 206 may be located in a single installation or may be dispersed among many different geographical locations.

The computing devices 203 and 206 correspond to the computing devices 118 (FIG. 1). The computing devices 203 and 206 may correspond to differing hardware platforms in various embodiments. Accordingly, the computing devices 203 and 206 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 203a, 203b ... 203n may have a first hardware configuration, while all computing devices 206a, 206b ... 206n may have a second hardware configuration.

For example, the computing devices 203 may have a certain ratio of a first type of resource to a second type of resource, while the computing devices 206 may have a different ratio of the first type of resource to the second type of resource. In a specific example, the computing devices 203 may have a relatively high amount of memory, while the computing devices 206 may have a relatively high amount of CPU resources. In another specific example, the computing devices 203 may have a relatively high amount of CPU resources, while the computing devices 206 may have a relatively high amount of GPU resources. Although only two sets of computing devices 203 and 206 are shown, it is understood that there may be any number of sets of computing devices 203 and 206 having different hardware configurations.

As a non-limiting example, a customer who is planning to run a data store that will respond to a high volume of queries for small quantities of data may prefer to have a computing device 203, 206 with relatively high storage IOPS capability over storage bandwidth. By contrast, a customer who is planning to run a data backup archive may prefer to have a computing device 203, 206 with relatively high storage bandwidth capability over storage IOPS. The data backup archive may not respond to many requests, but when a request is received, a large quantity of bandwidth may be preferred to transfer data from the data backup archive.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 600 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the hosted computing environment 103 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance. The customer may also configure additional or fewer network addresses for the particular machine instances as needed. The operator of the hosted computing environment 103 may need to ensure that spare computing capability is available in the hosted computing environment 103 to accommodate such new machine instances. At the same time, too much spare computing capability may be costly and resource inefficient.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. As a non-limiting example, the customer data 233 may include network pages to be served up by one or more network page servers executing on machine instances associated with a customer. However, it is understood that in some embodiments customer-specific data may be stored within local data storage associated with a machine instance.

Returning now to FIG. 1, a general description of the operation of the various components of the networked environment 100 is provided. To begin, an aggregation router 115 may be given an initial allocation of network addresses for the network 109. A rack 112 or other subdivision may be configured for the hosted computing environment 103 behind the aggregation router 115. Multiple other routers and networking hardware may be interposed between the rack 112 and the aggregation router 115 in various embodiments. In some embodiments, the router 121 in the rack 112 may be coupled to the network 109 without an aggregation router 115.

The rack 112 may be initially configured with a set of computing devices 118. In some cases, one or more of the computing devices 118 may be initially configured to host one or more machine instances 124. In some cases, one or more of the computing devices 118 may have no initial configuration into machine instances 124. All of the physical spaces within the rack 112 may be initially occupied, or physical spaces within the rack 112 may be available. The address allocation service 127 assigns network address allocations to the rack 112 based at least in part on a default assignment configuration, the device types for each of the computing devices 118 in the rack 112, historical assignment velocity or address usage velocity for the types of the computing devices 118, historical assignment velocity or address usage velocity for the customer(s) associated with the computing devices 118, and/or other factors.

As a non-limiting example, a rack 112 may be initially configured with 20 computing devices 118 of a certain device type. In response to the number of computing devices 118, the type of the computing devices 118, and/or other data, the address allocation service 127 may decide to assign the rack 112 a "/27" block of 32 addresses. To this end, the address allocation service 127 may automatically configure the router 121 to advertise this particular block of addresses, thereby implementing the allocation. The address allocation service 127 may select the particular block of addresses from within a larger block of addresses (e.g., a "/22" or other block) that has been allocated to the corresponding aggregation router 115.

Continuing with the non-limiting example, it may be that each of the 20 computing devices 118 is initially configured to use a single corresponding address from the "/27" block. Various addresses in the block may be reserved as a network number, gateway address, broadcast address, and so on. As the rack 112 is reconfigured, address utilization may rise. Additional computing devices 118 may be added to the rack 112, additional machine instances 124 may be added to the computing devices 118, customers may request additional network addresses for their machine instances 124 or computing devices 118, and/or other reconfigurations may take place. The network monitor service 130 may monitor the network topology, address allocations, device usage including address utilization, and/or other information regarding the hosted computing environment 103. Data associated with and indicating the reconfiguration may be stored in the network topology data 133, the address allocation history 139, the device type data 142, the device usage data 145, etc. Such data indicating a reconfiguration may be provided directly to the address allocation service 127 in some embodiments. Thresholds may be established to ensure that address allocations are performed in advance of address exhaustion.

For example, the address allocation service 127 may obtain data that indicates that a reconfiguration of the rack 112 has resulted in an increased quantity of machine instances 124. Consequently, the address allocation service 127 may decide to assign another "/27" block of network addresses to the particular rack 112. The block of network addresses in some cases may be selected as a subset of the addresses allocated to the aggregation router 115. Upon assignment, the address allocation service 127 may automatically reconfigure the router 121 to implement the additional address allocation.

The address allocation service 127 may be configured to prefer contiguous allocations, if available. In some cases, based at least in part on address allocation history 139, customer data 148, and/or other factors, the address allocation service 127 may initially reserve unassigned address allocations which are contiguous to an assignment, where the reservation is for possible future use. If demand in other racks 112 leads to additional assignments, such reserved allocations may be assigned to other racks if needed. Thus, non-contiguous assignments may be necessary.

If contiguous allocation assignments are made, the address allocation service 127 may be configured to consolidate assignments. For example, if two "/27" networks are contiguously allocated, the address allocation service 127 may be configured to roll up the two "/27" allocations into one "/26" allocation. Likewise, if four "/27" networks are contiguously allocated, the address allocation service 127 may be configured to roll up the four "/27" allocations into one "/25" allocation. In one embodiment, by combining contiguous allocations, additional addresses that were previously reserved addresses for the smaller allocations (e.g., network number, broadcast address, etc.) may become assignable to computing devices 118. By performing this route aggregation or summarization, the routing demands on the routers 121 and aggregation routers 115 may be reduced.

In one embodiment, a router 121 (or aggregation router 115) may be configured to advertise routes that are not assigned to computing devices 118 for purposes of aggregation. For example, three contiguous address allocations 136 for "/27" blocks may be assigned to a particular rack 112. The address allocations 136 may be aggregated into a single "/25" block in spite of including one unassigned "/27" block within the "/25" block in order to simplify routing advertisements. The unassigned "/27" block may be reserved for future use by the rack 112 or may be split off later for use by another rack 112 depending on demand.

While some reconfigurations in racks 112 may lead to greater address utilization, other reconfigurations may lead to reduced address utilization. For example, a rack 112 that was previously assigned an address allocation 136 of a "/22" block may now only be using 400 addresses, which could fit within a "/23" block. Such reduced utilization may occur when fewer machine instances 124 are being hosted on gaining computing devices 118 that have become relatively underpowered. Consequently, the address allocation service 127 may release another "/23" block from the original "/22" allocation. Thresholds may be used to provide hysteresis. Hysteresis may be desirable to avoid releasing an allocation that could be used within a short while. For example, address utilization might temporarily dip below 512 for a "/22" block, but a "/23" might not be released until address utilization is below 450.

In some cases, addresses within the block to be released may already be in use. In such cases, the address allocation service 127 may be configured to initiate a transition of computing devices 118 away from addresses in the block to be released to addresses in the block to be retained. In some embodiments, moving computing devices 118 from one address to another may be undesirable and may result refraining from releasing portions of the address allocation 136. For example, although only 400 addresses in a "/22" block might be used, due to existing address utilization, the address allocation service 127 might only release a "/24" block. The address allocation service 127 may be configured with thresholds to prevent breaking up address allocations 136 into numerous small blocks to avoid problematic routing table overhead.

The examples discussed above may be extended to address allocations 136 assigned to aggregation routers 115 as well. The portion of the hosted computing environment 103 that is behind an aggregation router 115 may be considered a subdivision of the network 109. To this end, blocks of network addresses may be allocated to an aggregation router 115 based at least in part on predicted or actual demand, e.g., the racks 112, the computing devices 118, the machine instances 124, etc. that are serviced by the aggregation router 115. Actual or predicted for network addresses may increase or decrease over time, thereby resulting in additional address allocations 136 being assigned or in existing address allocations 136 being released for reassignment.

Figure 3:
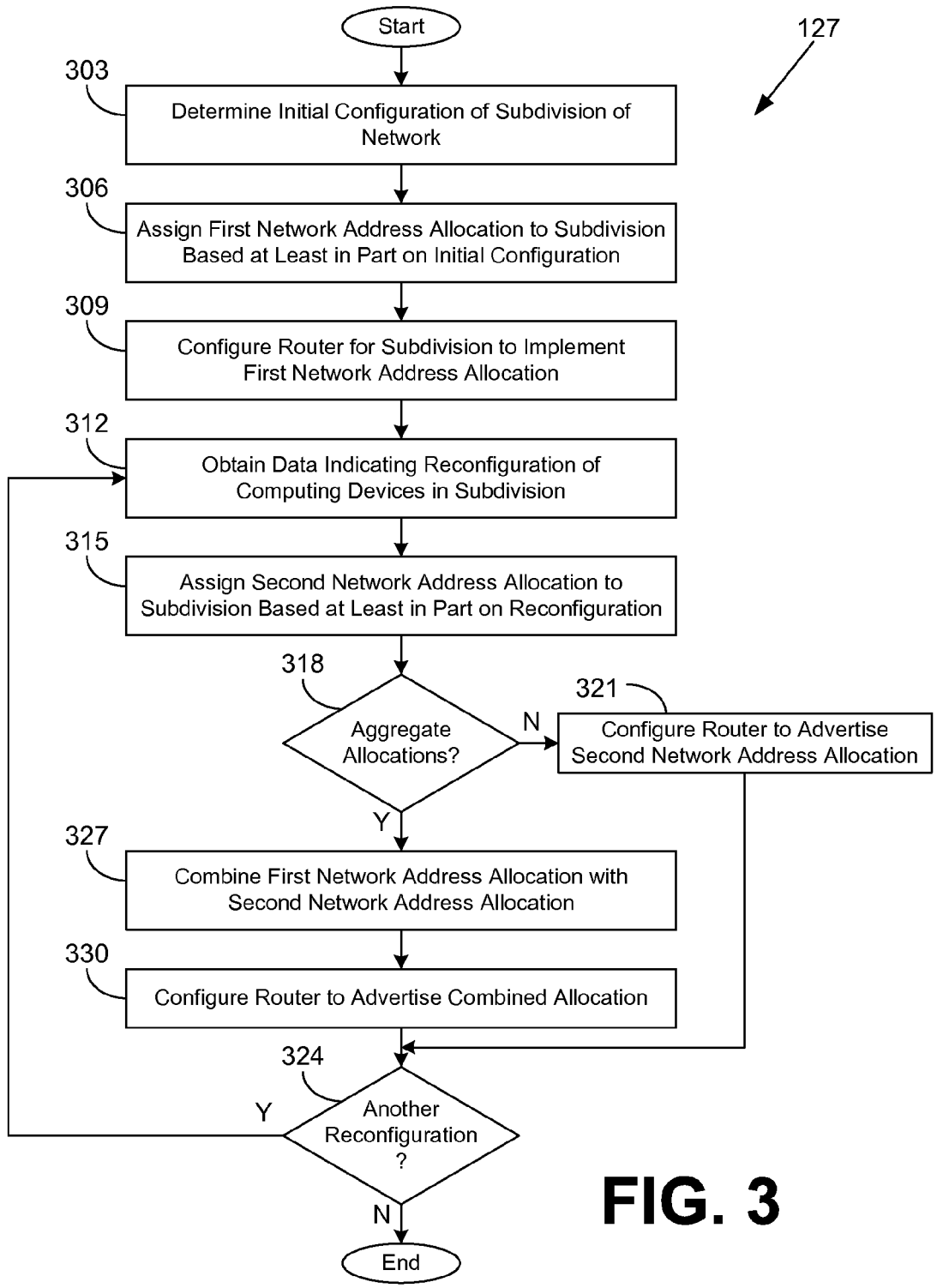
FIGS. 3 and 4 are flowcharts illustrating examples of functionality implemented as portions of an address allocation service executed in a computing environment in the networked environment of FIG. 1 according to various embodiments of the present disclosure.

Referring next to FIG. 3, shown is a flowchart that provides one example of the operation of a portion of the address allocation service 127 according to various embodiments. It is understood that the flowchart of FIG. 3 provides merely an example of the many different types of functional arrangements that may be employed to implement the operation of the portion of the address allocation service 127 as described herein. As an alternative, the flowchart of FIG. 3 may be viewed as depicting an example of steps of a method implemented in the computing environment 106 (FIG. 1) according to one or more embodiments.

Beginning with box 303, the address allocation service 127 determines an initial configuration of a subdivision of a network 109 (FIG. 1). The subdivision may correspond to a rack 112 (FIG. 1), the portion of a hosted computing environment 103 (FIG. 1) that is behind a given aggregation router 115 (FIG. 1), or another subdivision. To this end, the address allocation service 127 may refer to data gathered by the network monitoring service 130 (FIG. 1) to determine the topology of the network 109, the computing devices 118 (FIG. 1) and their device types, the machine instances 124 (FIG. 1) that have been configured, the customers associated with the machine instances 124, and so on.

In box 306, the address allocation service 127 assigns a first address allocation 136 (FIG. 1) to the subdivision based at least in part on the initial configuration. For example, the address allocation 136 may be determined based at least in part on the respective device type for each of the computing devices 118, the projected demand for network addresses, and/or other factors. In box 309, the address allocation service 127 configures the router 121 (FIG. 1) (or aggregation router 115, as the case may be) to implement the first address allocation 136.

In box 312, the address allocation service 127 obtains data, e.g., from the network monitor service 130, that indicates a reconfiguration of the computing devices 118 in the subdivision. For example, additional computing devices 118 may be added, computing devices 118 may be replaced with more powerful computing devices 118, computing devices 118 may be reconfigured with more machine instances 124, computing devices 118 may be reconfigured for customers who tend to use many network addresses, and so on. In the case of FIG. 3, the reconfiguration indicates an increase in actual or predicted address utilization. In box 315, the address allocation service 127 assigns a second address allocation 136 to the subdivision based at least in part on the reconfiguration. The second address allocation 136 may be selected, for example, based on contiguity with the first address allocation 136. For example, "10.1.0.0/24" is contiguous with "10.1.1.0/24." Contiguity may depend on the ability of the address allocations 136 to fit within a particular subnet mask. The size of the second address allocation 136 may be determined, for example, based on a velocity of address assignment, allocation, or utilization.

In box 318, the address allocation service 127 determines whether to aggregate the first and second address allocations 136. For example, "10.1.0.0/24" may be aggregated with "10.1.1.0/24" to produce "10.1.1.0/23." In some embodiments, non-contiguous address allocations 136 may be aggregated. If the address allocation service 127 determines not to aggregate the first and second address allocations 136, the address allocation service 127 moves to box 321 and configures the router 121 (or aggregation router 115, as the case may be) to advertise the second address allocation 136 as a separate route. The address allocation service 127 then continues to box 324.

If, instead, the address allocation service 127 determines that the first and second address allocations 136 are to be aggregated, the address allocation service 127 continues from box 318 to box 327 and combines the first address allocation 136 with the second address allocation 136. In box 330, the address allocation service 127 configures the router 121 (or aggregation router 115, as the case may be) to advertise the combined address allocation 136. The address allocation service 127 then proceeds to box 324.

In box 324, the address allocation service 127 determines whether another reconfiguration has occurred. If another reconfiguration has occurred, the address allocation service 127 returns to box 312 and obtains data that indicates the reconfiguration. If another reconfiguration has not occurred, the portion of the address allocation service 127 ends.

Figure 4:
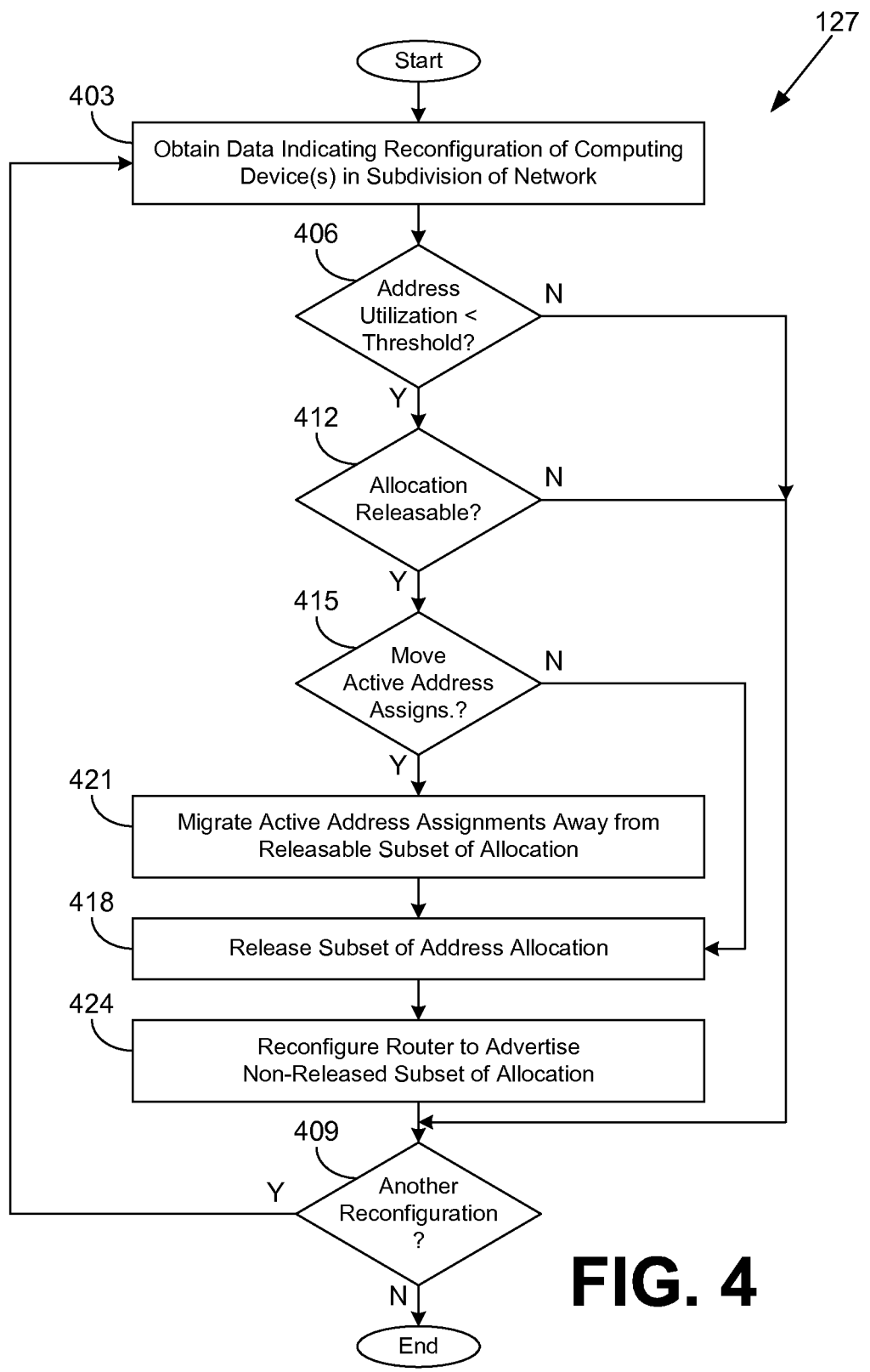

Turning now to FIG. 4, shown is a flowchart that provides one example of the operation of another portion of the address allocation service 127 according to various embodiments. It is understood that the flowchart of FIG. 4 provides merely an example of the many different types of functional arrangements that may be employed to implement the operation of the portion of the address allocation service 127 as described herein. As an alternative, the flowchart of FIG. 4 may be viewed as depicting an example of steps of a method implemented in the computing environment 106 (FIG. 1) according to one or more embodiments.

Beginning with box 403, the address allocation service 127 (FIG. 1) obtains data, e.g., from the network monitor service 130 (FIG. 1), that indicates a reconfiguration of the computing devices 118 (FIG. 1) in a subdivision of a network 109 (FIG. 1) (e.g., rack 112 (FIG. 1), a portion of a hosted computing environment 103 (FIG. 1) behind an aggregation router 115 (FIG. 1), etc.). For example, computing devices 118 may be removed, computing devices 118 may be reconfigured with fewer machine instances 124, computing devices 118 may be reconfigured for customers who tend to use fewer network addresses, and so on. In the case of FIG. 4, the reconfiguration indicates a reduction in actual or predicted address utilization.

In box 406, the address allocation service 127 determines whether the address utilization for the subdivision is below a threshold. If not, the address allocation service 127 proceeds to box 409 and no releasing of address allocations 136 (FIG. 1) occurs. If so, the address allocation service 127 continues from box 406 to box 412 and determines whether at least a portion of the address allocation 136 for the subdivision is releasable. For example, the address allocation 136 may be populated with addresses which are currently in use and cannot be moved, thus making the address allocation 136 potentially non-releasable. If the address allocation 136 is not releasable, the address allocation service 127 continues to box 409.

If the address allocation 136 is releasable, the address allocation service 127 transitions from box 412 to box 415 and determines whether to move active address assignments. If not, the address allocation service 127 continues to box 418. If, instead, active address assignments are to be moved, the address allocation service 127 continues from box 415 to box 421 and migrates active address assignments away from a releasable subset of the address allocation 136. This may involve automatic reconfiguration of the computing devices 118 that are involved, notifying the customers associated with the computing devices 118, etc.

In box 418, the address allocation service 127 releases the subset of the address allocation 136. In box 424, the address allocation service 127 reconfigures the router 121 (or aggregation router 115, as the case may be) to advertise the non-released subset of the address allocation 136. As a non-limiting example, where the address allocation 136 was "10.1.1.0/23," address assignments may be migrated away from "10.1.1.0/24" and "10.1.1.0/24" may be released. The route to "10.1.0.0/24" may subsequently be advertised. If the released subset of the address allocation 136 is not aggregated with another subset, then it may be the case that no new route is advertised as a result. The address allocation service 127 proceeds to box 409.

In box 409, the address allocation service 127 determines whether another reconfiguration has occurred. If another reconfiguration has occurred, the address allocation service 127 returns to box 403 and obtains data that indicates the reconfiguration. If another reconfiguration has not occurred, the portion of the address allocation service 127 ends.

Figure 5:
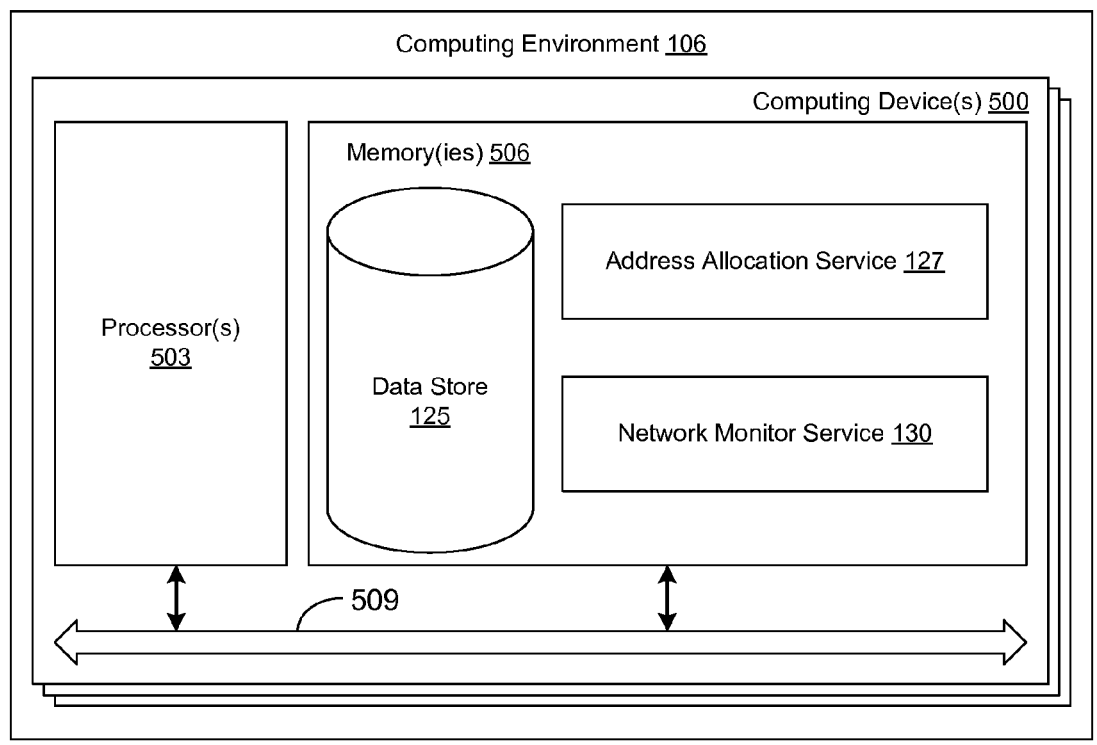
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 106 according to an embodiment of the present disclosure. The computing environment 106 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the address allocation service 127, the network monitor service 130, and potentially other applications. Also stored in the memory 506 may be a data store 125 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the address allocation service 127, the network monitor service 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the address allocation service 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the address allocation service 127 and the network monitor service 130, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:
1. A system, comprising:
    at least one computing device; and
    at least one service executable in the at least one computing device, wherein when executed the at least one service causes the at least one computing device to at least:

determine that a quantity of virtualized machine instances executed on a plurality of computing devices has changed;
dynamically assign an updated network address allocation to a subdivision of a network in response to the quantity of virtualized machine instances, the subdivision including the plurality of computing devices; and
reconfigure a router for the subdivision to implement the updated network address allocation.

2. The system of claim 1, wherein the quantity of virtualized machine instances has been increased relative to a previous quantity of virtualized machine instances hosted by the plurality of computing devices.

3. The system of claim 1, wherein the quantity of virtualized machine instances employ a variable quantity of network addresses.

4. The system of claim 1, wherein, in response to the updated network address allocation being implemented, the router is configured to advertise a contiguous network address allocation that includes the updated network address allocation and another network address allocation that is contiguous to the updated network address allocation and is unassigned to the subdivision.

5. The system of claim 1, wherein when executed the at least one service further causes the at least one computing device to at least:
determine a network address assignment velocity associated with the plurality of computing devices; and
determine the updated network address allocation based at least in part on the network address assignment velocity.

6. The system of claim 1, wherein when executed the at least one service further causes the at least one computing device to at least:
determine a respective computing device type associated with each of the plurality of computing devices; and
determine the updated network address allocation based at least in part on the respective computing device type associated with each of the plurality of computing devices.

7. The system of claim 1, wherein when executed the at least one service further causes the at least one computing device to at least determine the updated network address allocation based at least in part on contiguity of the updated network address allocation with a previous network address allocation.

8. The system of claim 1, wherein the subdivision corresponds to a rack, and the router corresponds to a rack-associated router.

9. A system, comprising:
at least one computing device; and
at least one service executable in the at least one computing device, wherein when executed the at least one service causes the at least one computing device to at least:
determine that a quantity of virtualized machine instances hosted by a computing device included in a subdivision of a network has changed, the subdivision being assigned a network address allocation;
dynamically release an assignment of a first subset of the network address allocation in response to the quantity of virtualized machine instances; and
reconfigure a router for the subdivision to advertise a second subset of the network address allocation instead of the network address allocation.

10. The system of claim 9, wherein the quantity of virtualized machine instances has been reduced relative to a previous quantity of virtualized machine instances hosted by the computing device.

11. The system of claim 9, wherein when executed the at least one service further causes the at least one computing device to at least determine that the quantity of virtualized machine instances meets a threshold for releasing the first subset of the network address allocation.

12. The system of claim 9, wherein when executed the at least one service further causes the at least one computing device to at least reconfigure the computing device in the subdivision to use a first network address in the second subset of the network address allocation instead of a second network address in the first subset of the network address allocation before reconfiguring the router.

13. The system of claim 9, wherein when executed the at least one service further causes the at least one computing device to at least:
determine that the quantity of virtualized machine instances has changed again;
assign another network address allocation to the subdivision in response to the quantity of virtualized machine instances that has changed again; and
reconfigure the router for the subdivision to advertise the other network address allocation in addition to the second subset of the network address allocation.

14. A method, comprising:
determining, by at least one computing device, that a quantity of virtualized machine instances executed on a plurality of computing devices has changed;
dynamically assigning, by the at least one computing device, an updated network address allocation to a subdivision of a network in response to the quantity of virtualized machine instances, the subdivision including the plurality of computing devices; and
reconfiguring, by the at least one computing device, a router for the subdivision to implement the updated network address allocation.

15. The method of claim 14, wherein, in response to the updated network address allocation being implemented, the router is configured to advertise a contiguous network address allocation that includes the updated network address allocation and another network address allocation that is contiguous to the updated network address allocation and is unassigned to the subdivision.

16. The method of claim 14, wherein the quantity of virtualized machine instances employ a variable quantity of network addresses.

17. The method of claim 14, further comprising:
determining, by the at least one computing device, a network address assignment velocity associated with the plurality of computing devices; and
determining, by the at least one computing device, the updated network address allocation based at least in part on the network address assignment velocity.

18. The method of claim 14, further comprising:
determining, by the at least one computing device, a respective computing device type associated with each of the plurality of computing devices; and
determining, by the at least one computing device, the updated network address allocation based at least in part on the respective computing device type associated with each of the plurality of computing devices.

19. The method of claim 14, further comprising determining, by the at least one computing device, the updated network address allocation based at least in part on contiguity of the updated network address allocation with a previous network address allocation.

20. The method of claim 14, wherein the subdivision corresponds to a rack, and the router corresponds to a rack-associated router.

\* \* \* \* \*